Jan. 15, 1929.
J. L. BAIRD
1,699,270
APPARATUS FOR TRANSMITTING VIEWS OR IMAGES TO A DISTANCE
Filed May 4, 1928
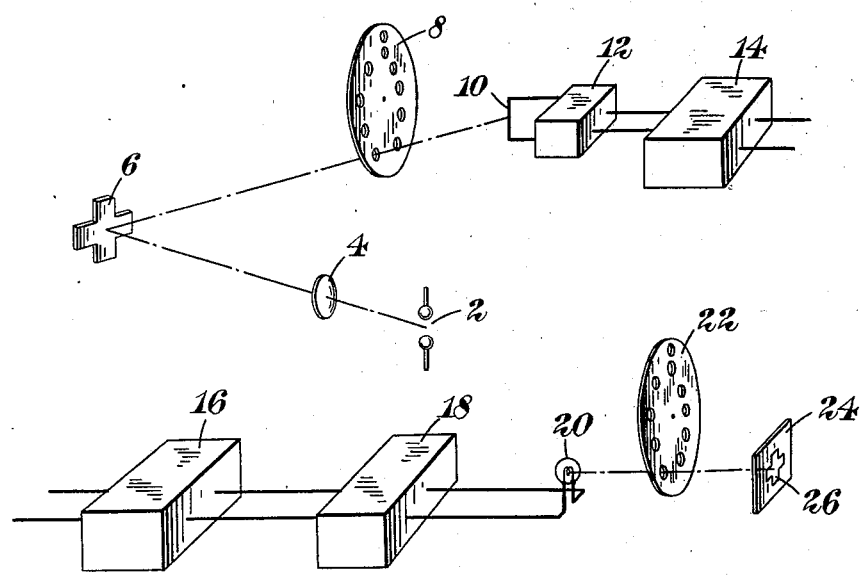
INVENTOR
John Logie Baird
BY Watson, Coit, Morse & Grindle ATT'YS

Patented Jan. 15, 1929.

1,699,270

UNITED STATES PATENT OFFICE.

JOHN LOGIE BAIRD, OF LONDON, ENGLAND, ASSIGNOR TO TELEVISION LIMITED, OF LONDON, ENGLAND, A BRITISH COMPANY.

APPARATUS FOR TRANSMITTING VIEWS OR IMAGES TO A DISTANCE.

Application filed May 4, 1928, Serial No. 275,180, and in Great Britain December 21, 1926.

In apparatus for transmitting views or images to a distance, including what is commonly known as television apparatus, it is known to use substances which change their electrical resistances, or alternatively emit an electric current under the action of light, for the purpose of converting the luminous radiation emitted by or reflected from the object whereof an image is to be transmitted, into electric currents. Such currents are transmitted by metallic conductors or wirelessly to the receiving station, where the signals are utilized to constitute a reproduction of the object.

In my co-pending patent application Serial No. 224,711, I have described a method of seeing in darkness by utilizing radiation immediately outside the visible spectrum ordinarily known as infra-red rays, or heat rays, such radiation being detected by a bolometer or similar device.

The present invention contemplates the use of other forms of radiant energy for the purpose of vision and this invention accordingly comprises a method of viewing an object consisting in projecting upon it electromagnetic waves of short wave-length adjacent the infra-red radiation in the spectrum but of longer wave-length then the infra-red rays, exploring the object or an image thereof by a device sensitive to such waves comprising a tuned oscillating circuit with a detector, modulating a source of visible light by such device, and traversing a spot of light projected from said source over a screen in synchronism with the exploration of the object. It will thus be seen that by reason of the different character of the waves used in the method set forth herein, it is essential that a distinctly different type of receiving apparatus be used, the bolometer or similar device of my copending application above referred to being replaced by apparatus for detecting the short wireless waves.

The source of visible light may be remote from the modulating device, being controlled by a wired or wireless transmission of the modulating impulses, similar to the systems used in television.

It is well known that wireless waves can be refracted and reflected in a manner similar to visible light waves, subject to such differences as arise from the difference in wave-length, and by a suitable choice of materials for refractors or reflectors all the desired effects can be obtained. Thus for example, a conductor such as a metallic body will act as a reflector for long waves, whereas an insulator may be completely permeable to such waves. By using electromagnetic waves of very short wave-length, however, that is to say, waves which in the spectrum are adjacent to but of longer wave-length than the infra-red, the refraction and reflection effects are very similar to those obtained with wave-lengths within the visible spectrum.

This invention also comprises apparatus for carrying out the method above set forth and the accompanying drawing shows, in diagrammatic form, one arrangement of such an apparatus.

In the drawing, radiation from a generator 2 (which may consist of two metal spheres across which an oscillating discharge passes) of waves of the desired length is projected by means of a lens 4, formed of pitch or other material suitable for the purpose, upon the object 6 the image of which is to be transmitted. The object 6, by the aid of an exploring device 8, is explored by a device 10 such as a wire equivalent to the aerial of a wireless receiver, sensitive to the waves referred to, which device is electrically connected with or forms part of a tuned oscillating circuit. The oscillating current thus set up in this circuit is rectified by a rectifier or detector 12. The device 12 may be any suitable detecting device, such as a crystal detector, a thermionic valve, or a pair of metal spheres the sparks passing between which and due to the oscillating current in the tuned circuit act upon a selenium or other sensitive cell and thereby cause the necessary fluctuating electric current to be set up by the latter. The rectified current is then, if need be, amplified by an amplifier 14 and transmitted to the receiver 16 either by a wired connection or by the carrier wave of a wireless transmitter of usual construction, which wave is modulated in accordance with the varying current. From the receiver 16 the current passes, by way of a further amplifier 18, if such be necessary, to a source of visible light 20, such as a glow-discharge or other suitable lamp the radiation from which is controlled in accordance with the current variation. This lamp 20 operates in conjunction with n exploring device 22 running in synchronism with the exploring device 8 and provides on a screen 24 a visible image 26 of the object 6.

While the construction of the generator 2 may be such as to emit waves of other lengths than those by which this method is carried out, such undesired waves are eliminated by reason of their passage through a medium which absorbs or obstructs them. It is apparent that in the use of the apparatus for the purpose of penetrating fog and viewing an object at a distance, the fog effectually prevents passage of the undesired waves. The same function may be performed by the lens or screen 4 which is preferably formed of pitch or some other material serving as a screen and permitting the passage of short wireless waves only. The invention may thus be used for transmitting the waves without the risk of detection by the object on which they are projected, and the method is thus extremely valuable in case the invention is used during a war, for instance, where it is desired to view the enemy's position without detection.

It has been found that the length of the electromagnetic wave projected through a fog materially affects the capacity of the wave to penetrate the fog, the penetrative power increasing as the fourth power of the wave length. It will thus be seen that the short wireless waves are able to penetrate a fog more easily than the shorter infra-red waves or the still shorter light waves. It is furthermore apparent that when either light waves or infra-red waves are used in television it is necessary to receive these waves by a light sensitive device or heat sensitive device, whereas the use of short wireless waves in television permits reception of the reflected waves by a wireless detector, and such detectors are much more sensitive than the ordinary light sensitive device. A further advantage of the method disclosed herein lies in its application to the reproduction of an object near at hand, such as a person in the same room with the projecting apparatus. The use of blinding light or of undesirable heating effects such as are obtained when light rays or infra-red rays are used are entirely absent, and waves of the short wireless length have absolutely no ill effect on the person on whom they are projected.

I claim:

1. A method of viewing an object consisting in projecting upon it electromagnetic waves of short wave length adjacent the infra-red part of the spectrum but of longer wave length than the infra-red rays through a medium for absorbing projected waves of all other lengths, converting only the said waves reflected from successive portions of the object into a modulated electric current, producing visible light from said modulated current, and projecting the light on corresponding successive portions of a screen.

2. Apparatus of the class described comprising a generator of electromagnetic waves of short wave length adjacent the infra-red part of the spectrum but of longer wave length than the infra-red rays, means for projecting said waves upon an object, means intermediate said projecting means and said object for absorbing projected waves of all other lengths, a device sensitive to such waves and unaffected by light waves, an exploring device by means of which the object is explored by the sensitive device, a source of visible light, means for modulating said visible light, under control of the sensitive device, a screen, and means for traversing a spot of light projected from said source over said screen in synchronism with the exploration of the object.

3. Apparatus of the class described comprising a generator of electromagnetic waves of short wave length adjacent the infra-red part of the spectrum but of longer wave length than the infra-red rays, means for projecting said waves upon an object, means formed of pitch through which said projected waves are caused to pass, a device sensitive to the said waves and unaffected by light waves, an exploring device by means of which the object is explored by the sensitive device, a source of visible light and means for modulating said visible light under control of the sensitive device.

In testimony whereof I affix my signature.

JOHN LOGIE BAIRD.